United States Patent [19]

Takekoshi et al.

[11] Patent Number: 5,097,168

[45] Date of Patent: Mar. 17, 1992

[54] ELECTRICAL MOTOR

[75] Inventors: Yukinori Takekoshi; Makoto Ukai; Shuuichi Kiri; Yukihisa Suzumura; Satoshi Takefushi; Naotoshi Kaito, all of Nakatsugawa; Yoshio Kasuga, Amagasaki; Yuuji Nakahara, Amagasaki; Masahiro Taguchi, Amagasaki; Kenichi Azuma, Amagasaki; Shigekazu Sakabe, Amagasaki, all of Japan

[73] Assignee: Mitsubishi Denki Kabushiki Kaisha, Tokyo, Japan

[21] Appl. No.: 606,867

[22] Filed: Oct. 31, 1990

[30] Foreign Application Priority Data

Feb. 6, 1990 [JP] Japan .................................. 2-26675

[51] Int. Cl.$^5$ .............................................. H02K 1/12
[52] U.S. Cl. ............................................ 310/254; 310/43; 310/45; 310/68 R; 310/71; 310/89; 310/194
[58] Field of Search .................... 310/254, 258, 71, 43, 310/261, 208, 72, 259, 89, 42, 45, 194, 68 R, 216

[56] References Cited

U.S. PATENT DOCUMENTS

| | | | |
|---|---|---|---|
| 2,871,384 | 1/1959 | Gabriel | 310/254 |
| 3,209,183 | 9/1965 | Bollibon | 310/71 |
| 3,609,427 | 8/1971 | Lautner et al. | |
| 3,909,673 | 9/1975 | Kreissl | 310/71 |
| 4,090,098 | 5/1978 | Kranzler | 310/71 |
| 4,355,255 | 10/1982 | Herr | 310/254 |
| 4,456,844 | 6/1984 | Yamamoto | 310/43 |
| 4,491,752 | 1/1985 | O'Hara | 310/71 |
| 4,549,105 | 10/1985 | Yamamoto | 310/43 |
| 4,563,606 | 1/1986 | Fukasawa | 310/208 |
| 4,633,110 | 12/1986 | Genco | 310/71 |

FOREIGN PATENT DOCUMENTS

| | | |
|---|---|---|
| 967387 | 11/1957 | Fed. Rep. of Germany . |
| 2518951 | 11/1975 | Fed. Rep. of Germany . |
| 2851405 | 6/1979 | Fed. Rep. of Germany . |
| 2575614 | 7/1986 | France . |
| 0141576 | 10/1981 | Japan . |
| 58-33945 | 5/1983 | Japan . |
| 0032980 | 8/1984 | Japan . |
| 62-40934 | 8/1987 | Japan . |
| 62-176763 | 11/1987 | Japan . |
| 64-81642 | 3/1989 | Japan . |

Primary Examiner—R. Skudy
Attorney, Agent, or Firm—Oblon, Spivak, McClelland, Maier & Neustadt

[57] ABSTRACT

A motor having a stator which comprises a stator iron core 6 formed by fitting an inner ring magnetic pole portion 10 into an outer ring yoke portion 5, the inner ring magnetic pole portion 10 having slots 8 and magnetic poles 7; an insulating member 11 covering the inner ring magnetic pole portion of the stator iron core; a funnel-like insulating 13 which is formed integrally with the insulating member 11 to cover an end surface 14 of the inner ring magnetic pole portion 10 and which has a first through hole 15 for rotary shaft to communicate with the central portion of the inner ring magnetic pole portion 10 spool frames 23, 24 with pins 28 formed on the magnetic poles 7 so as to be integral with the insulating member 13; a rotor 16 inserted in the inner ring magnetic pole portion; 10; a funnel-like insulating cover 18 having a second through hole 20 for rotary shaft which is in alignment with the first through hole 15, the insulating cover 18 being mounted on the other end surface 12 of the inner ring magnetic pole portion 10 and coils 32, 34 wound on the stator iron core 6 and fitted in the slots 8 in a parallel and crosswise shape, the coils 32, 34 having ends engaged with the pins 28, wherein openings 49 are formed in an outer casing 41 for receiving therein the stator so that the spool frames are inserted in the openings 49; a terminal block 50 connected to a cord for power feeding and supporting electronic devices 52 which are connected with the pins 28 is mounted on the spool frames and a cover 58 is fitted to the outer casing 41.

2 Claims, 8 Drawing Sheets

FIGURE 7(a)
FIGURE 7(b)
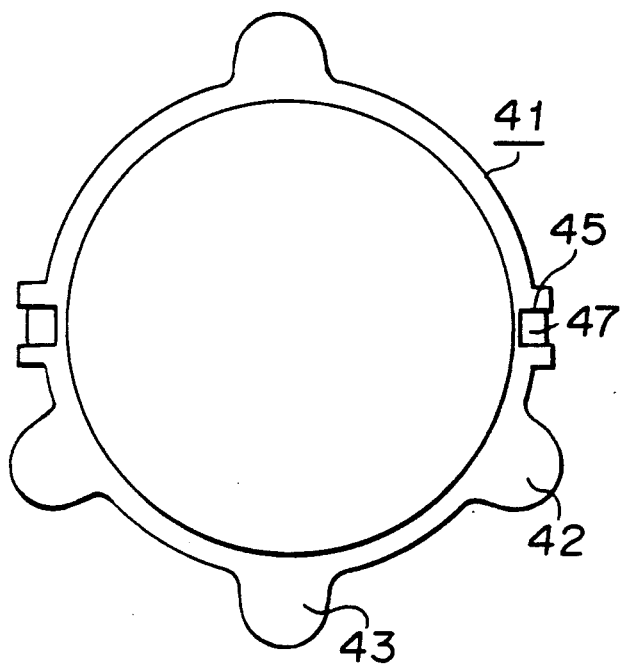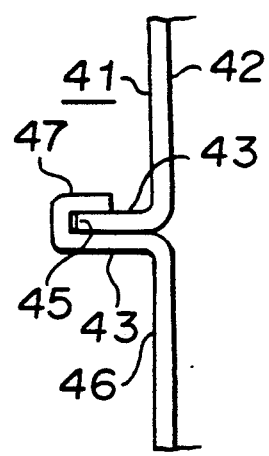
FIGURE 8(a)
FIGURE 8(b)
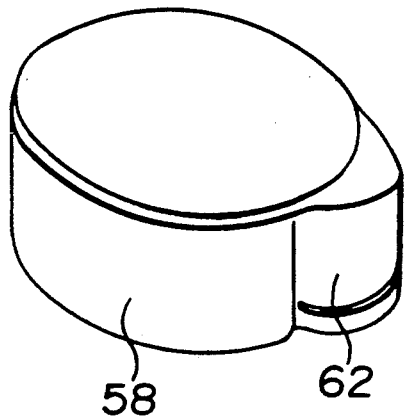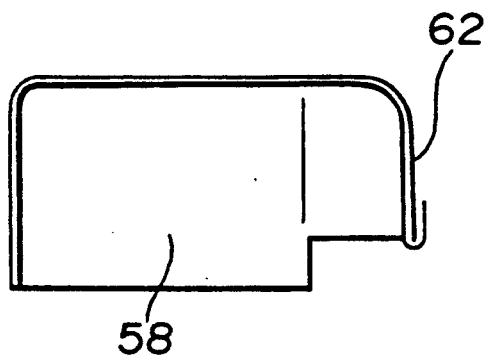

ELECTRICAL MOTOR

BACKGROUND OF THE INVENTION FIELD OF THE INVENTION

The present relates to a motor of a type that a stator iron core is divided into an outer ring yoke portion and an inner ring magnetic pole portion, a rotor is inserted in the inner ring magnetic pole portion, and a coil is wounded on the inner ring magnetic pole portion.

DISCUSSION OF THE BACKGROUND

There has been known a motor of a kind as shown in FIG. 15 that a stator 3 is formed by laminating a number of iron sheets each having slots at its inner circumference and a coil 4 is wounded by an insert method along the slots 1 of the stator 3 (as shown, for instance, in Japanese Unexamined Utility Model Publication No. 141576/1981).

Further, there has been proposed as shown in FIG. 16, a motor in which lead wires 4a are connected to terminals of the coil 4 wound on the stator 3 which is contained in an outer casing, the lead wires 4a being connected to cords for power supply (as disclosed, for instance, in Japanese Examined Patent Publication No. 32980/1984).

The conventional motors described above had disadvantages that since the coil 4 was wound along the slots 1 in the stator by an insert method, the perimeter of the coil was elongated, an amount of wire to be used for the coil is large, and the characteristics become inferior. Further, there were problems that parts of coil 4 bulged out from the slots 1, coil ends became loose, much time was required for forming the coil, for fastening the coil and a treatment of varnish, and mechanization was difficult.

The connection between the coil 4 and the lead wires 4a and the connection between a fuse and the coil 4 were performed by manual operations, and it was impossible to connect a capacitor (not shown) or the other electrical elements to the coil 4.

SUMMARY OF THE INVENTION

It is an object of the present invention to provide a motor wherein an amount of wire used for the coil is reduced by shortening the perimeter of the coil to thereby provide excellent characteristics, the bulging out of the coil from the slots and looseness in coil ends can be eliminated, post-treatment is simple and mechanization can be employed, especially, the mechanization of connecting the coil to the lead wires and a fuse is allowed, and it is possible to connect a capacitor to the coil.

In the present invention, there is provided a motor having a stator which comprises a stator iron core 6 formed by fitting an inner ring magnetic pole portion 10 into an outer ring yoke portion 5, the inner ring magnetic pole portion 10 having slots 8 and magnetic poles 7; an insulating member 11 covering the inner ring magnetic pole portion 10 of the stator iron core 6; a funnel-like insulating member 13 of an insulating resinous material which is formed integrally with the insulating member 11 to cover an end surface 14 of the inner ring magnetic pole portion 10 and which has a first through hole 15 for rotary shaft to communicate with the central portion of the inner ring magnetic pole portion 10, a spool frame 22 with pins 27 formed on the magnetic poles 7 so as to be integral with the funnel-like insulating member 13; a rotor 16 inserted in the inner ring magnetic pole portion 10; a funnel-like insulating cover 18 having a second through hole 20 for rotary shaft which is in alignment with the first through hole 15, the insulating cover 18 being mounted on the other end surface 12 of the inner ring magnetic pole portion 10 and a coil 30 wound on the stator iron core 6 and fitted in the slots 8 in a parallel and crosswise shape, the coils 32, 34 having ends engaged with the pins 27, wherein openings 49 are formed in an outer casing 41 for receiving therein the stator so that the spool frame 22 is inserted in the openings 49; a terminal block 50 connectable to a cord for power feeding 56 and supporting an electronic device 52 which is connected with the pins 27 is mounted on the spool frame 22, and a cover 58 is fitted to the outer casing 41.

BRIEF DESCRIPTION OF THE DRAWINGS

FIGS. 7a and 7b are respectively plane view and an enlarged cross-sectional view partly omitted of the outer casing of the motor of the present invention;

FIGS. 8a and 8b are respectively a perspective view and a cross-sectional view of a cover used for the motor of the present invention;

DESCRIPTION OF THE PREFERRED EMBODIMENTS

Figure 9:
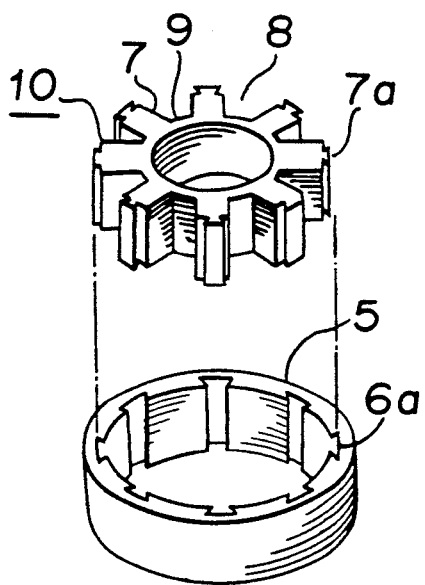
FIG. 9 is a perspective view showing fitting portions between an outer ring yoke portion and an inner ring magnetic pole portion.
Figure 10:
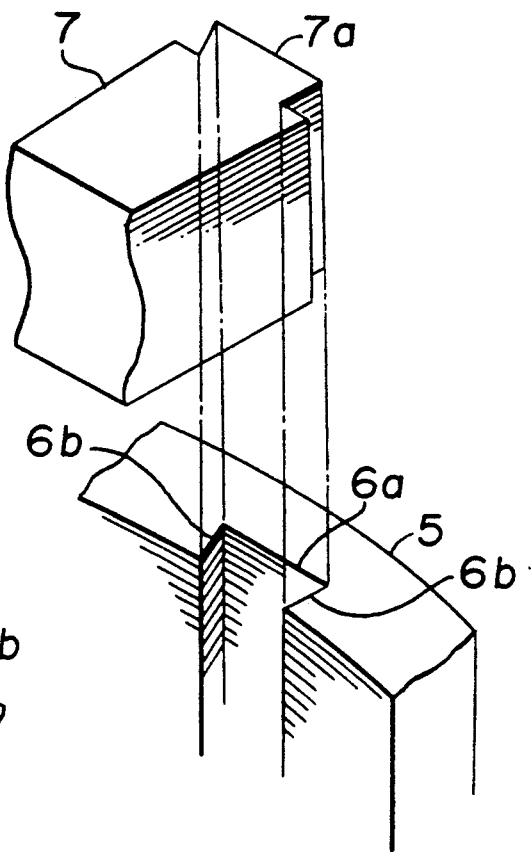
FIG. 10 is an enlarged perspective view partly omitted of the yoke portion and the magnetic pole portion as in FIG. 9.
Figure 11:
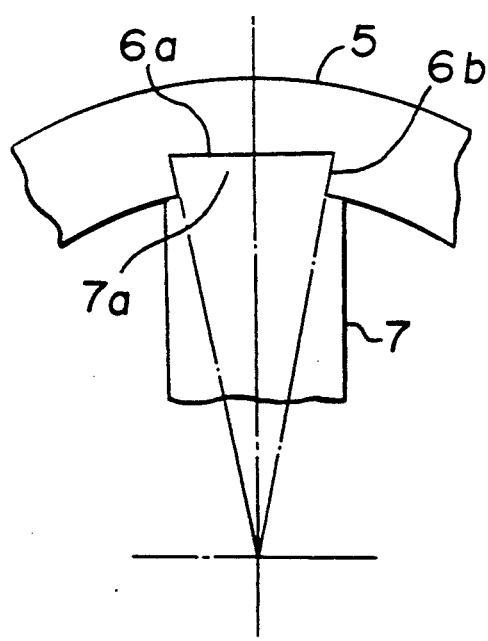
FIG. 11 is a plane view of the portions as shown in FIG. 10.
Figure 12:
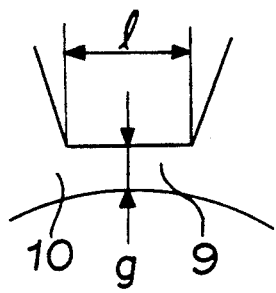
FIG. 12 is a diagram showing a bridge portion in an enlarged scale.
Figure 13:
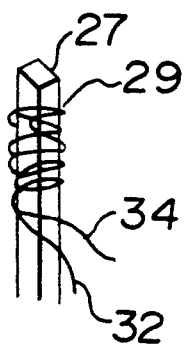
FIG. 13 is a perspective view showing a spool frame around which a wire is bound.
Figure 14:
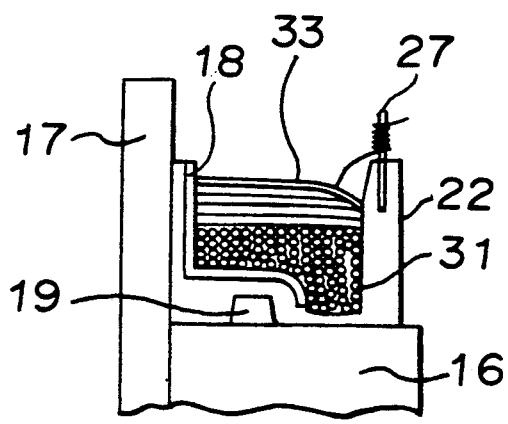
FIG. 14 is a cross-sectional view showing a part of the motor of the present invention.
Figure 15:
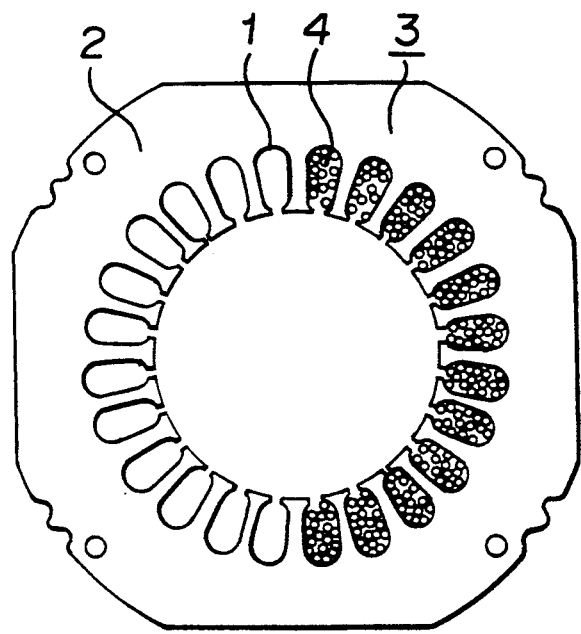
FIG. 15 is a plane view of the stator of a conventional motor.
Figure 16:
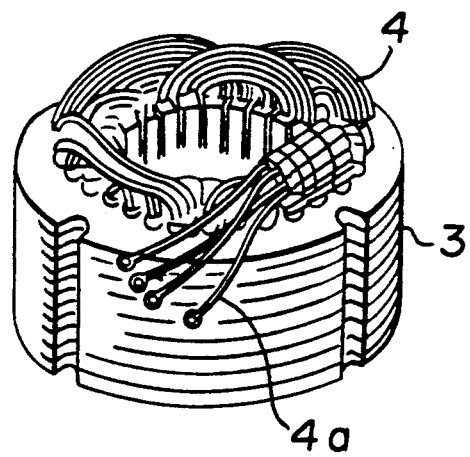
FIG. 16 is a perspective view of a conventional motor.

A preferred embodiment of the motor according to the present invention will be described with reference to FIGS. 1-14. In the Figures, with particular reference to FIGS. 9-11, a reference numeral 5 designates an outer ring yoke portion which constitutes an outer ring portion of a stator iron core 6 and which is formed by laminating punched iron sheets which are obtained by punching a coiled steel sheet material by a high speed automatic punching machine (not shown) to a predetermined thickness followed by caulking the laminated iron sheets. In punching the coiled steel sheet material, punched products for a stator and punched products for a rotor iron core, are simultaneously and separately punched out. A numeral 6a designates recesses for fittings formed at the inner circumference of the outer ring yoke portion 5. A numeral 6b designates opposing side wall surfaces formed at both side portions of each of the recesses 6a, which are formed so as to coincide with the center line of an inner ring magnetic pole portion (which is described hereinafter). A numeral 7 designates a plurality of magnetic poles projecting from the inner circumference of the yoke portion 5 toward the direction of the center, between which slots 8 are formed. An end portion 7a of each of the magnetic poles 7 is fitted into each of the recesses 6a formed in the outer ring yoke portion 5, as shown in FIG. 10. Bridges 9 are formed to connect end portions of adjacent magnetic poles. The outer circumference of the bridge is formed in flat, the length l of the bridge is determined to be 5 mm or more, and the width g of the central portion of the bridge is within 0.3 mm–0.5 mm. A numeral 10 designates an inner ring magnetic pole portion including the above-mentioned bridges 9 and magnetic poles 7, as shown in FIG. 9. The inner ring magnetic portion is formed by, for instance, stacking punched iron sheets each having a thickness of from 0.35 mm to 0.5 mm. It does not cause any problem in the shape and the width of the bridges having a width of 0.3 mm–0.5 mm even by punching iron sheets having a thickness of about 5 mm by a pressing machine (not shown). Further, a sufficient strength is given to the inner ring magnetic pole portion even by forming it by stacking the punched iron sheets.

Figure 1:
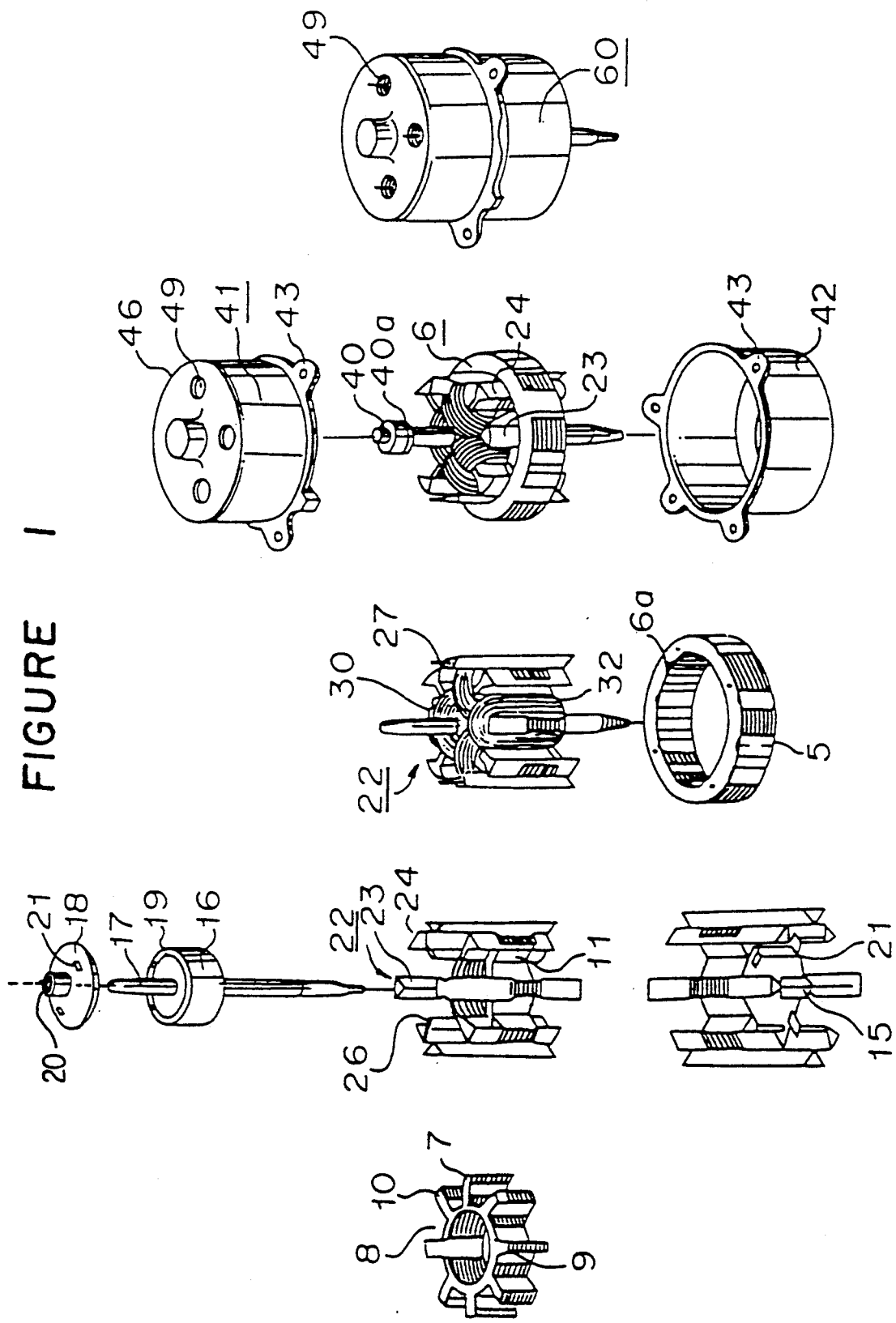
FIGS. 1 and 2 are perspective views showing an embodiment of assembling the motor of the present invention.
Figure 5:
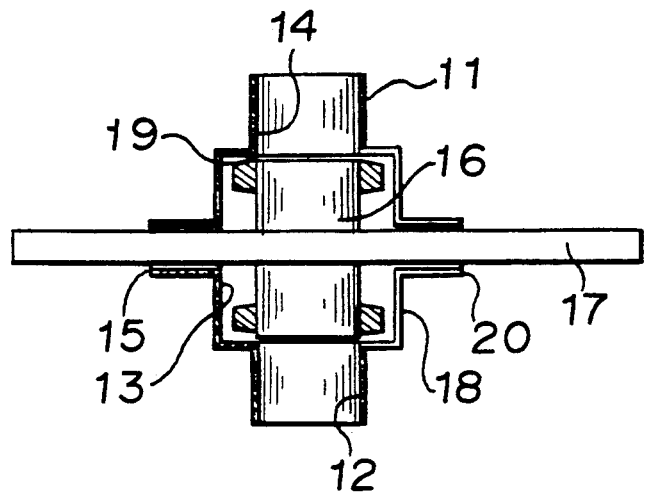
FIG. 5 is a longitudinal cross-sectional view of the rotor of the motor of the present invention.

As shown in FIG. 5, a numeral 11 designates an insulating member formed on the stator by, for instance, injection molding, and the insulating member is formed so as to cover the magnetic poles 7 of the inner ring magnetic pole portion 10 and the insulating member 11 is firmly attached to the slots 8 and on an end surface 12 of the inner ring magnetic pole portion 10. A numeral 13 designates f funnel-like insulating resin member which is contiguous to an end surface 14 of the inner ring magnetic pole portion 10 and which is mold-shaped on and firmly attached to the end surface 14. The shape of the insulating resin member 13 is in a funnel-shape and has a first through hole having a square shape at the free end of the funnel-like portion. A numeral 16 designates a rotor to be located around inner ring magnetic pole portion 10. A rotary shaft 17 is fitted to the axial center of the rotor. A numeral 18 designates an insulating cover which is formed into a funnel-like shape by using a single piece of material. With the insulating cover 18, an end ring 19 as an electric conductive member of the rotor 16 is isolated from the outside. The insulating cover 18 has a second through hole 20 in a circular shape at its one end and is detachably mounted onto the end surface 12 of the inner ring magnetic pole portion 10. As shown in FIG. 1, numeral 21 designates drain holes formed in the insulating resin member 13 and the insulating cover 18. A numeral 22 designates a spool frame extending to both end planes of the magnetic poles 7 and is formed integrally with the insulating member 11 and the insulating resin member 13. The spool frame 22 is disposed at the top end of the magnetic poles so that they function as a guide for winding which is constituted by triangular poles whose apex faces the center of the inner ring magnetic pole 10. The spool frame 22 comprises a first spool frames 23 having pins at their top end and second spool frames 24 without pins which are lower than the first spool frames 23. The spool frames 23, 24 are alternately arranged at predetermined positions on the inner ring magnetic pole portion 10. A numeral 25 designates a recess formed in side walls of each of the spool frames 23 so that ends of coils can be extended along the recess 25.

Figure 6:
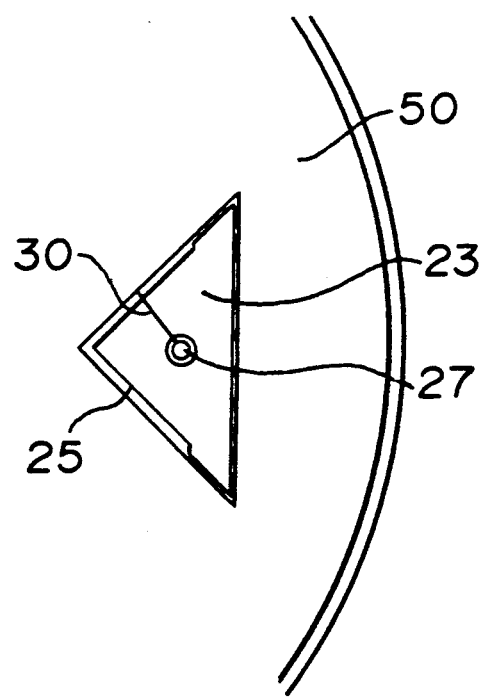
FIG. 6 is a plane view partly broken which shows the connection of a spool frame and a terminal block used for the motor of the present invention.

As shown in FIG. 6 a numeral 26 designates a projection formed in each of the second spool frames 24 so as to project from an apex of triangular-shaped spool frames 24 toward the center of the inner ring magnetic pole portion 10. The coils wound on the stator are in contact with the projections 26.

Figure 3:
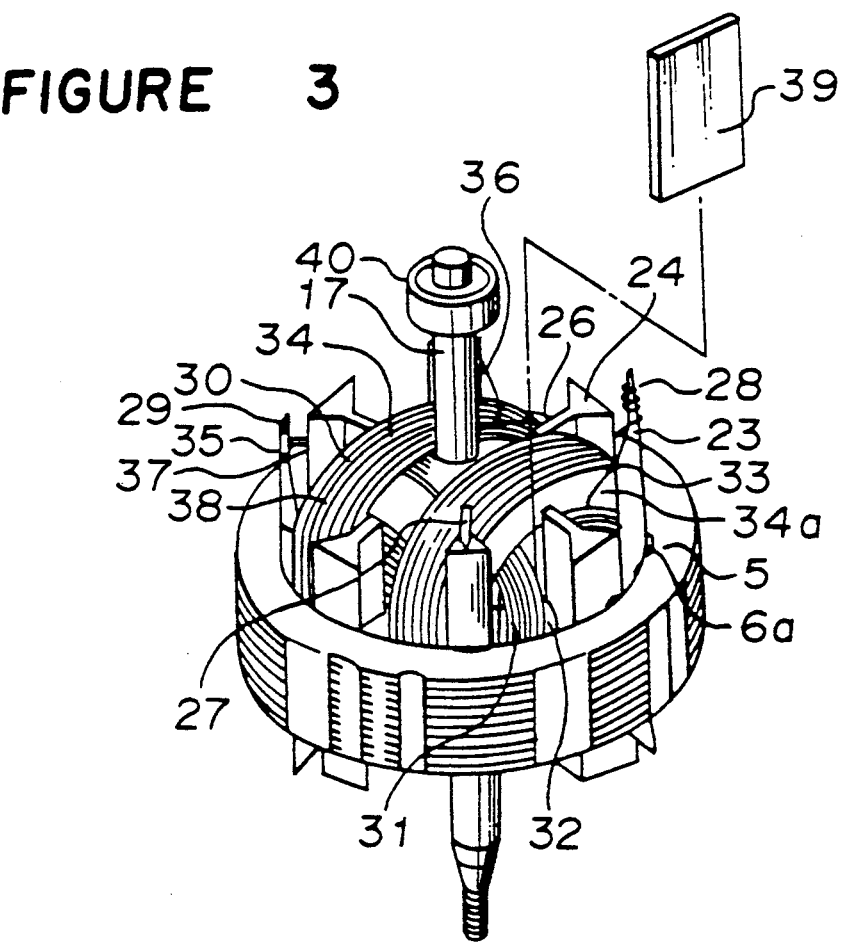
FIG. 3 is a perspective view showing the stator and rotor of the motor of the present invention wherein a wedge to be attached is separately shown.

As shown in FIG. 3, a numeral 27 designates a pin main body which comprises a pin 28 inserted into the top of the first spool frames 23 and a common portion 29. The pin main body 27 is conductive to a main coil and an auxiliary coil as described in detail below. A numeral 30 designates a coil which comprises a main coil 32 as an inner coil 31 which has a high space factor in the slots 8 and an auxiliary coil 34 as an outer coil 33 which has a low space factor in the slots 8 and magnet wires made of a self-adhesion material. A numeral 34a designates a leading end portion of the main coil 32, a numeral 35 designates a tail portion of the main coil 32, a numeral 36 designates a leading end portion of the auxiliary coil 34 and a numeral 37 designates a tail portion of the auxiliary coil 34. A floating wire in the coil ends of the coils 32, 34 are bonded by a ultraviolet curing rein 38. A numeral 39 designates an insulating wedge to electrically insulate the coil 30 from the outer ring yoke portion 5 and the wedge is inserted in and fitted to a gap between the outer ring yoke portion 5 and the coil 30. A numeral 40 designates a bearing such as a ball bearing fitted to the rotary shaft 17. A numeral 40a designates an E-type retaining ring which is fitted to the rotary shaft 17 so as to hold the bearing 40.

As shown in FIG. 7, a numeral 41 designates an outer casing and a numeral 42 designates a frame as a part of the outer casing which is provided with a flange 43 at its circumferential end. A numeral 45 designates a plurality of recesses for caulking formed in the flange which function to receive projections as described later. A numeral 46 designates a bracket having a flange 43 at its circumferential end. A plurality of projections 47 extend from the flange 43. A numeral 49 designates through holes formed in the bracket 46 so that the spool frames 22 are inserted in the through holes 49 when the motor 60 is to be assembled. A numeral 50 as shown in FIG. 6, designates a terminal block having legs 51 to be inserted in the through holes, see FIG. 2.

Figure 2:
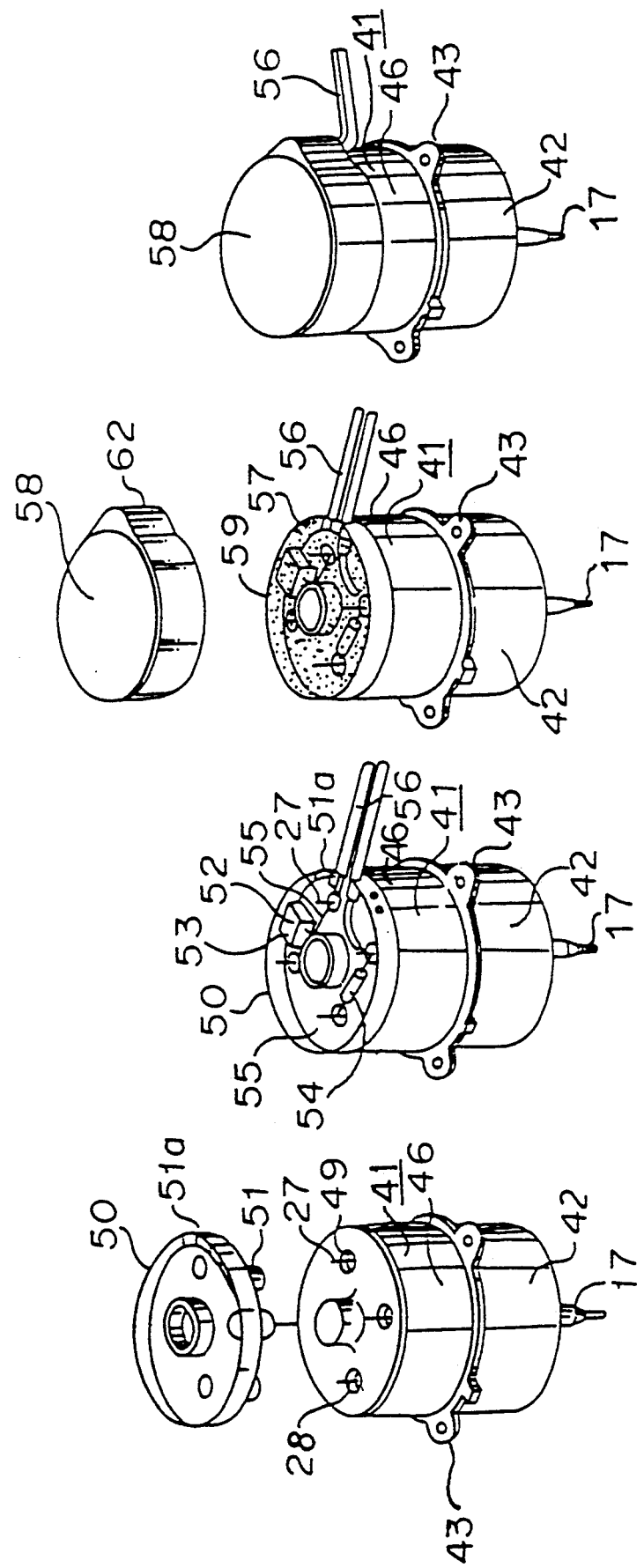

As shown in FIG. 2, the terminal block is made of a material such as an insulating resin and the legs 51 have an opening so that the pin main body 27 projects through the opening at a predetermined length. A numeral 51a designates a groove for receiving a cord, and a numeral 52 designates electronic devices such as a capacitor 53, a fuse 55 and so on which are disposed on the terminal block 50. Lead wires 55 connected to the electronic devices are so arranged that the ends of the lead wires extend perpendicular to the pin main body 27. When the terminal block 50 is disposed on the outer casing 41, the lead wires 55 are connected to the pin main body 47 by, for instance, electric resistance welding. A numeral 56 designates a cord for power supply wherein the ends are exposed at a predetermined length so as to facilitate the connection. A numeral 57 designates putty, for instance, a two-part system putty which is curable at the room temperature, preferably, it is of a violet curable type in order to eliminate the flowing of it. Thus, molding operations are conducted to form the terminal block 50 with use of the putty 57. A numeral 58 designates a cover having an opening at one end and a bottom at the other end, which is fitted to the bracket 24 to protect the terminal block 50 made of metal and a molded portion 59 formed by curing the putty 57. A numeral 62 designates a bulged-out portion formed at the side wall of the cover 58 which is used as an outlet for the cord 56 for power supply as shown in FIG. 8. The edge portion of the bulged-out portion is curved toward the outside, whereby there is no danger of damage to the cord for power supply by the edge portion.

Figure 4:
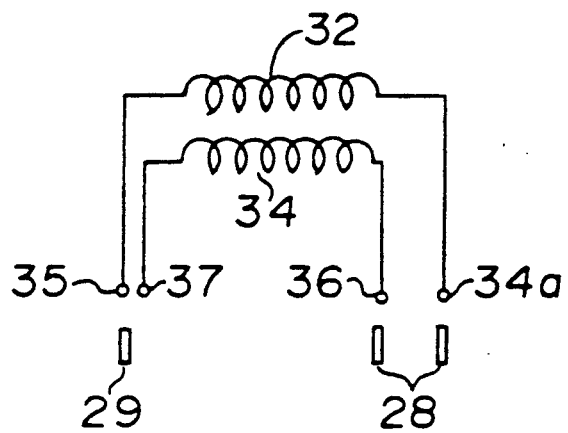
FIG. 4 is a circuit diagram of the coils of the motor of the present invention.

The motor having the construction described above is assembled as follows, as shown in FIG. 1 and 2. The inner ring magnetic pole portion 10 is prepared by forming the spool frames 22 with the pin main bodies 27 and the insulating resin member 13. The insulating resin member 13 with the first through hole 15 is fitted to the inner ring magnetic pole portion 10. The rotary shaft 17 is inserted to the inner ring magnetic pole portion 10 so that the rotary shaft 17 is also passed through the first through hole 15, whereby the rotor 16 is formed. Then, the insulating cover 18 is fitted to the inner ring magnetic pole portion so that the rotary shaft 17 is inserted into the second through hole 20 to thereby electrically isolate the end ring 19. Then, a flyer type winding machine (not shown) capable of multispindle control is used to connect the terminals of the coil 30 to predetermined pin main bodies 27, and the coil 32 is wounded around the rotor 16 so as to extend in the slots 8 in a parallel and crosswise relation. The tail ends of the main coil 32 are engaged with the predetermined pin main bodies 27. Thus, the main coil 27 is formed in the inner portion. Similarly, the coil 34, see FIG. 3, is wound on the main coil 32 so as to be along the slots 8 in a parallel and crosswise relation. Thus, the auxiliary coil 34 is formed. In this case, as shown in FIG. 4, the tail portion 37 of the auxiliary coil 34 is connected in an overlapping state to the engaging portion of the tail portion of the main coil 32 to thereby form the common portion 29. The pin main bodies 27 to which the leading end 34a of the main coil 32 and the leading end 36 of the auxiliary coil 34 are connected is dipped in molten solder, whereby the main coil 32 and the auxiliary coil 36 are electrically connected to the pin 28. Since the common portion 29 is merely engaged with the pin 28 and the common portion is not electrically connected to the pin 28, a dielectric test between the main coil 32 and the auxiliary coil 34 is conducted by checking a dielectric strength by the application of a predetermined voltage across the pins 28. Then, the common portion 29 is dipped in molten solder, whereby the tail end 35 of the main coil 32 and the tail end 37 of the auxiliary coil 34 become simultaneously conductive to the pins 28.

New inner ring magnetic pole portion 10 is forcibly fitted to the outer ring yoke portion 5 which is heated by a heating medium (not shown) so that they are certainly connected through the recesses for fitting 6a by the shrinkage of cooling at the yoke portion 5. Thus, the stator iron core 6 is formed. Further, the wedge 39 is inserted between the coil 30 and the yoke portion 5 for electrical insulation as shown in FIG. 3. Then, the coil 30 is heated to soften a fuse-bond layer of the magnet wire made of a self-fuse-bonding material to thereby firmly bond the coil 30. The bearing 40 and the E-type retaining ring 40a are fitted to the rotary shaft 17. The stator iron core 6 is forcibly inserted int he frame 42 and at the same time, the bracket 46 is put on the frame 42 from the top so that the projections 47 of the bracket 46 are inserted into the recesses for caulking 45 of the frame 42. Then, the frame 42 is connected to the bracket 46 by bending the projections 47 so as to clamp the flange 43 of the frame 42 as shown in FIG. 7. The capacitor 53, the fuse 54 and other electric devices are mounted on the terminal block 50 and the lead wires 55 are shaped in predetermined shapes to connect them. The legs 51 are inserted in the through holes 49 of the bracket 46. In this case, the spool frame 22 of the inner ring magnetic pole portion 10 is inserted into the legs 51 of the terminal block 50, followed by determination of position, the fixing of the elements and the spot-welding of the end of the lead wires 55 to the pin main bodies 57 so that the end portion of the lead wires 55 and the pin main bodies 27 are overlapped in a perpendicular manner, whereby the connection of the elements are performed. A contactor (not shown) for testing is brought into contact with the pin main body 27 and a voltage is applied thereto to thereby carry out a test of the performance of the motor for predetermined items. The cord for power supply 56 is extended onto the block terminal 50, the cord 56 is preliminarily fastened on the terminal block 50 so that the leading end portion of the cord 56 is in perpendicular to the pin main body 27, and they are connected to each other by spot welding. Further, the putty 57 is applied onto the terminal block 50, and it is molded to insulate charged exposure portions such as lead wires 55 and to fix the electronic devices and the cord for power supply 56. Finally, the cord for power supply 56 is led outside through the bulged-out portion 62, and the cover 56 is fitted to the bracket 56.

The motor having the construction described above of the present invention provides the following advantages.

Since the coil is directly wound on the stator in a parallel and crosswise state, the perimeter of the coil is reduced and an amount of wire is used for the coil can be small in addition that a former for winding the wires is unnecessary, the height of the coil ends can be reduced, and the bulging-out of the coil can be eliminated, this unncessitating a post-treatment.

Further, since electronic devices, a cord for power supply and so on are connected to the motor body through the terminal block at a position out of the other casing, assembling work can be automated.

Since the terminal block is molded, the joining portion of the lead wires to the pins, electronic devices and a cord for power supply are sealingly held on the terminal block and certainly connected thereto, and excellent humidity resistance can be obtained.

We claim:

1. A motor comprising:
   a stator which comprises a stator iron core formed by fitting an inner ring magnetic pole portion into an outer ring yoke portion, the inner ring magnetic pole portion having slots and magnetic poles;
   a first insulating member covering said inner ring magnetic pole portion of the stator iron core;
   a funnel-like second insulating member of an insulating resinous material integrally formed with said first insulating member to cover a first end surface of the inner ring magnetic pole portion and which has a first through hole for a rotary shaft to communicate with a central portion of the inner ring magnetic pole portion, and a spool frame with pins formed on said magnetic poles so as to be integral with said second insulating member;

a rotor inserted in said inner ring magnetic pole portion;

an insulating cover having a second through hole for the rotary shaft, said second through hole being in alignment with said first through hole, said insulating cover being mounted on a second end surface of said inner ring magnetic pole portion;

a coil wound on the stator iron core and fitted in the slots in a parallel and crosswise shape, the coil having ends engaged with said pins, wherein openings are formed in an outer casing for receiving therein said stator so that said pins of said spool frame are inserted in the openings;

a terminal block connectable to a power cord and supporting an electronic device which is connected with the pins is mounted on the spool frames; and a cover fitted over said outer casing.

2. The motor according to claim 1, wherein said terminal block is a molded product.

* * * * *